(12) United States Patent
Kanehisa

(10) Patent No.: US 7,562,941 B2
(45) Date of Patent: Jul. 21, 2009

(54) BICYCLE DISC BRAKE HUB

(75) Inventor: Takanori Kanehisa, Sakai (JP)

(73) Assignee: Shimano Inc., Osaka (JP)

( * ) Notice: Subject to any disclaimer, the term of this patent is extended or adjusted under 35 U.S.C. 154(b) by 174 days.

(21) Appl. No.: 11/594,838

(22) Filed: Nov. 9, 2006

(65) Prior Publication Data

US 2007/0194620 A1 Aug. 23, 2007

(30) Foreign Application Priority Data

Feb. 17, 2006 (JP) .............................. 2006-040078
Apr. 4, 2006 (JP) .............................. 2006-103490
Jul. 18, 2006 (JP) .............................. 2006-195376

(51) Int. Cl.
  *B60B 27/00* (2006.01)
  *F16C 13/00* (2006.01)
(52) U.S. Cl. ..................... 301/110.5; 301/6.9; 384/545
(58) Field of Classification Search ............. 301/110.5, 301/105.1, 6.1, 6.8, 6.9; 188/17, 18 A, 24.11, 188/26, 218 XL; 384/544–545
See application file for complete search history.

(56) References Cited

U.S. PATENT DOCUMENTS

| 4,170,369 A | 10/1979 | Strutman |
| 5,433,534 A * | 7/1995 | Chen .......................... 384/545 |
| 5,496,114 A * | 3/1996 | Lin ............................. 384/458 |
| 5,626,401 A | 5/1997 | Terry, Sr. et al. |
| 6,139,192 A * | 10/2000 | Chiang ........................ 384/545 |
| 6,669,306 B1 * | 12/2003 | Hara et al. ............... 301/110.5 |
| 7,059,686 B2 * | 6/2006 | Kanehisa ................. 301/110.5 |

FOREIGN PATENT DOCUMENTS

| DE | 296 01 870 U1 | 7/1996 |
| FR | 2 752 773 A | 3/1998 |
| JP | 2004-142739 A | 5/2004 |
| JP | 2004-224337 A | 8/2004 |

\* cited by examiner

*Primary Examiner*—Jason R Bellinger
(74) *Attorney, Agent, or Firm*—Global IP Counselors, LLP

(57) ABSTRACT

A bicycle disc brake hub is basically provided with a hub axle and a hub shell rotatably disposed about the hub axle. The hub shell has a pair of flanges with a tubular portion extending between the flanges, and a rotor attachment portion configured to prevent an inside diameter of a disc brake rotor from increasing when the diameter of the hub axle increases. The rotor attachment portion is provided in the vicinity of a first shell end of the hub shell, and has a smaller outside diameter than the outside diameter of the tubular portion. A rotor of a disc brake device is attached to the rotor attachment portion.

18 Claims, 12 Drawing Sheets

BICYCLE DISC BRAKE HUB

CROSS-REFERENCE TO RELATED APPLICATIONS

This application claims priority under 35 U.S.C. § 119 to Japanese Patent Application No. 2006-040078, filed Feb. 17, 2006, Japanese Patent Application No. 2006-103490, filed Apr. 4, 2006 and Japanese Patent Application No. 2006-195376, filed Jul. 18, 2006. The entire disclosures of Japanese Patent Application Nos. 2006-040078, 2006-103490 and 2006-195376 are hereby incorporated herein by reference.

BACKGROUND OF THE INVENTION

1. Field of the Invention

This invention generally relates to a bicycle hub. More specifically, the present invention relates to a bicycle disc brake hub for mounting a disc brake rotor thereto.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle brake systems.

Recently, bicycles have been equipped with disc brake systems, which are known examples of bicycle brake devices. A disc brake system usually has a caliper connected to a brake lever mounted on the bicycle frame, and a disc brake rotor. The disc brake rotor is fixedly connected to a bicycle disc brake hub provided in the middle of a wheel of the bicycle. A bicycle disc brake hub generally has a hub axle, a hub shell rotatably mounted on the hub axle and a rotor attachment portion fixed to the hub shell. The hub axle is non-rotatably mounted to the bicycle frame. The hub shell is mounted around an external periphery of the hub axle such that it is capable of rotating around the hub axle. The rotor attachment portion configured to attach the disc brake rotor thereto. The hub shell has a cylinder portion provided between a pair of spoke mounting flanges. The rotor attachment portion is provided at one end of the hub shell, and has a greater outside diameter than the cylinder of the hub shell (see, for example, Japanese Laid-Open Patent Application No. 2004-142739 and Japanese Laid-Open Patent Application No. 2004-224337).

Increasing the diameter of the hub axle is an effective measure for improving the rigidity in this type of bicycle disc brake hub. However, if the hub axle is increased in diameter, the outside diameter of the hub shell must also increase accordingly. In this case, with this type of disc brake hub, the outside diameter of the rotor attachment portion increases together with the increase in the diameter of the hub shell. Thus, there must also be an increase in the inside diameter of the rotor attached to the rotor attachment portion.

In view of the above, it will be apparent to those skilled in the art from this disclosure that there exists a need for an improved bicycle disc brake hub. This invention addresses this need in the art as well as other needs, which will become apparent to those skilled in the art from this disclosure.

SUMMARY OF THE INVENTION

One object of the present invention is to provide a bicycle disc brake hub minimizes increasing an inside diameter of a rotor of a disc brake when the hub axle is increased.

The foregoing objects can basically be attained by providing a bicycle disc brake hub that basically comprises a hub axle, a hub shell and a rotor attachment portion in accordance with a first aspect of the present invention. The hub axle includes a first axle end and a second axle end with and a center axis extending between the first and second axle ends. The hub shell includes a tubular portion rotatably disposed on the hub axle, a first shell end with a first flange disposed at a first tubular end of the tubular portion, and a second shell end with a second flange disposed at a second tubular end of the tubular portion. The rotor attachment portion is disposed at the first shell end, the rotor attachment portion having a maximum outside diameter that is less than a maximum outside diameter of the tubular portion. In this bicycle disc brake hub, the outside diameter of the rotor attachment portion is less than the outside diameter of the tubular portion of the hub shell. Therefore, it is possible to prevent an increase in the outside diameter of the rotor attachment portion when the hub shell increases in diameter together with the hub axle. It is thereby possible with this bicycle disc brake hub to prevent an increase in the inside diameter of the disc brake rotor when the hub axle is increased in diameter.

According to a second aspect of the present invention, the bicycle disc brake hub of the first aspect of the present invention is provided such that the first shell end is rotatably supported on the first axle end by a first bearing. Also the second shell end is rotatably supported on the second axle end by a second bearing. The hub shell has an internal passage with the hub axle, the first bearing and the second bearing disposed therein, with the internal passage being configured and dimensioned such that the first and second bearings are installed into the internal passage of the hub shell from the second shell end of the hub shell, the first bearing and the second bearing disposed therein. Also the internal passage is configured and dimensioned such that the first and second bearings are installed into the internal passage of the hub shell from the second shell end of the hub shell. In a conventional bicycle disc brake hub, a bearing supporting one end of the hub shell is attached from one end side of the hub shell, and a bearing supporting the other end of the hub shell is attached from the other end side of the hub shell. Therefore, if the outside diameter of the rotor attachment portion provided to one end of the hub shell is reduced, then it may become difficult to attach the bearing that supports that end of the hub shell.

However, in this bicycle disc brake hub, it is possible to insert the first and second bearings into the internal passage from the second shell end side of the hub shell; i.e., the side opposite the one on which the rotor attachment portion is provided. Therefore, the rotor attachment portion is not a hindrance to attaching the first bearing, and the first and second bearings can be easily attached.

According to a third aspect of the present invention, the bicycle disc brake hub of the first or second aspect of the present invention is provided such that the hub shell further includes a spacer disposed in the internal passage between the first and second bearings to maintain separation between the first and second bearings. In this bicycle disc brake hub, the distance between the first and second bearings inserted through the internal passage of the hub shell is maintained by a spacer. There first and second bearings can thereby be disposed at a desired position within the internal passage of the hub shell, and it is no longer necessary, as it is in conventional practice, to form a contact surface for positioning the bearings in the inner peripheral surface of the hub shell.

According to a fourth aspect of the present invention, the bicycle disc brake hub of the third aspect of the present invention is provided such that the internal passage of the hub shell includes an inner peripheral surface with first bearing engagement surface engaging the first bearing and a second bearing engagement surface engaging the second bearing, with the second bearing engagement surface having a greater inside diameter than the first bearing engagement surface. In this bicycle disc brake hub, the inside diameter of the second bearing engagement surface is greater than the inside diameter of the first bearing engagement surface. Therefore, when the first bearing is inserted from the second shell end side of the hub shell through the second bearing engagement surface up to the first bearing engagement surface, it is possible to prevent damage to the second bearing engagement surface that occur from the first bearing coming in contact with the second bearing engagement surface.

According to a fifth aspect of the present invention, the bicycle disc brake hub of the fourth aspect of the present invention is provided such that the second bearing has a greater outside diameter than the first bearing. In this bicycle disc brake hub, since the second bearing has a greater outside diameter than the first bearing, it is possible to prevent spaces from forming between the second bearing and the inner peripheral surface of the hub shell without adding any new separate components even if the inside diameter of the second bearing engagement surface is increased to be greater than the inside diameter of the first bearing engagement surface.

According to a sixth aspect of the present invention, the bicycle disc brake hub of the fourth aspect of the present invention is provided such that the hub shell further includes an intermediate member disposed between an outer peripheral surface of the second bearing and the second bearing engagement surface of the hub shell, and the first and second bearings have outside diameters that are equal. In this bicycle disc brake hub, the area between the outer peripheral surface of the second bearing and the second bearing engagement surface of the hub shell is covered up by the intermediate member. Therefore, it is possible to prevent spaces from forming between the second bearing and the inner peripheral surface of the hub shell even if the inside diameter of the second bearing engagement surface is increased to be greater than the inside diameter of the first bearing engagement surface.

According to a seventh aspect of the present invention, the bicycle disc brake hub of the sixth aspect of the present invention is provided such that the intermediate member is formed integrally with the spacer. In this bicycle disc brake hub, the number of attachment steps can be reduced because the spacer and the intermediate member can be attached to the hub shell simultaneously.

According to an eighth aspect of the present invention, the bicycle disc brake hub of any one of the first to seventh aspects of the present invention is provided such that the rotor attachment portion includes that has a plurality of protuberances circumferential spaced apart to define splines with a bottom diameter that is less than the maximum outside diameter of the tubular portion. In this bicycle disc brake hub, the rotor attachment portion can be made more compact because the rotor can be non-rotatably connected by being fitted with the spline.

According to a ninth aspect of the present invention, the bicycle disc brake hub of any one of the first to seventh aspects of the present invention is provided such that the rotor attachment portion comprises a rotor attachment flange portion with a plurality of circumferential spaced apart bolt threading portions, and a rotor centering portion located on a side of the rotor attachment flange that is opposite to the first flange, the rotor centering portion having a smaller outside diameter than the maximum outside diameter the tubular portion. In this bicycle disc brake hub, the rotor can be fixed in place by using a multipurpose tool because the rotor can be attached by bolt members. Therefore, the rotor can easily be attached and removed.

In the bicycle disc brake hub according to the present invention, the outside diameter of the rotor attachment portion is less than the outside diameter of the tubular portion of the hub shell. Therefore, the outside diameter of the rotor attachment portion can be prevented from increasing when the hub shell increases in diameter together with the hub axle. It is thereby possible, in this bicycle disc brake hub, to prevent increases in the inside diameter of the disc brake rotor when the hub axle is increased in diameter.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
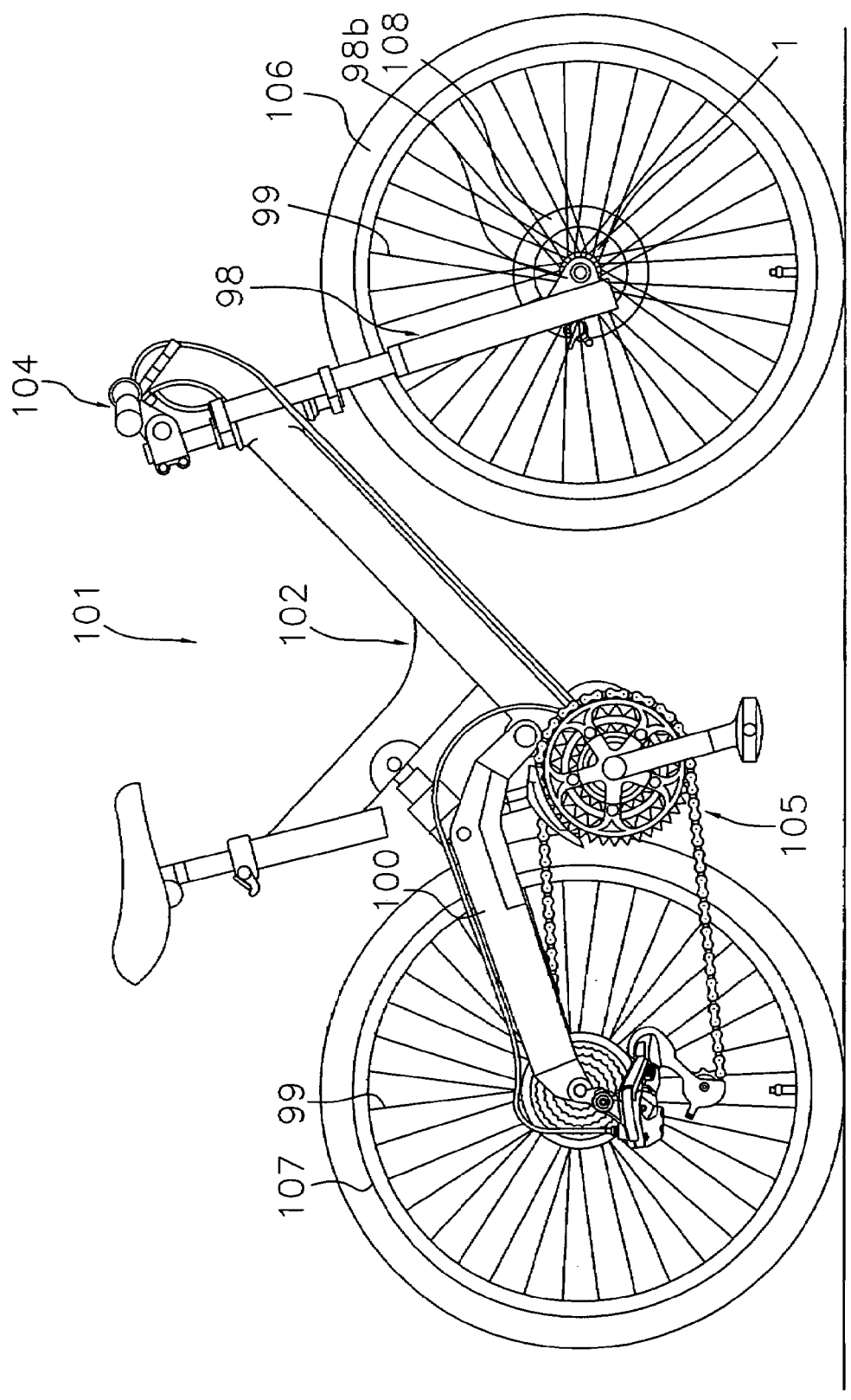
FIG. 1 is a side elevational view of a bicycle equipped with bicycle disc brake hubs in accordance with a first embodiment of the present invention.

Referring initially to FIG. 1, a bicycle 101 is illustrated is equipped with a front hub 1 in accordance with a first embodiment of the present invention. The bicycle 101 basically comprises a frame 102, a handlebar 104, a drive section 105, a front wheel 106, a rear wheel 107 and front and rear disc brake devices 108 (the rear disc brake device is not shown). The frame 102 is provided with front and rear suspensions, i.e., a front double-crown suspension fork 98 in the front and a swing arm 100 in the rear. The handlebar 104 is fastened to the suspension fork 98. The drive section 105 basically comprises a chain, a pair of pedals, a pair of derailleurs, and other conventional components. The front and rear wheels 106 and 107 are mounted to the suspension fork 98 and the swing arm 100, respectively, as seen in FIG. 1. The front and rear wheels 106 and 107 are each provided with a plurality of spokes 99.

Figure 2:
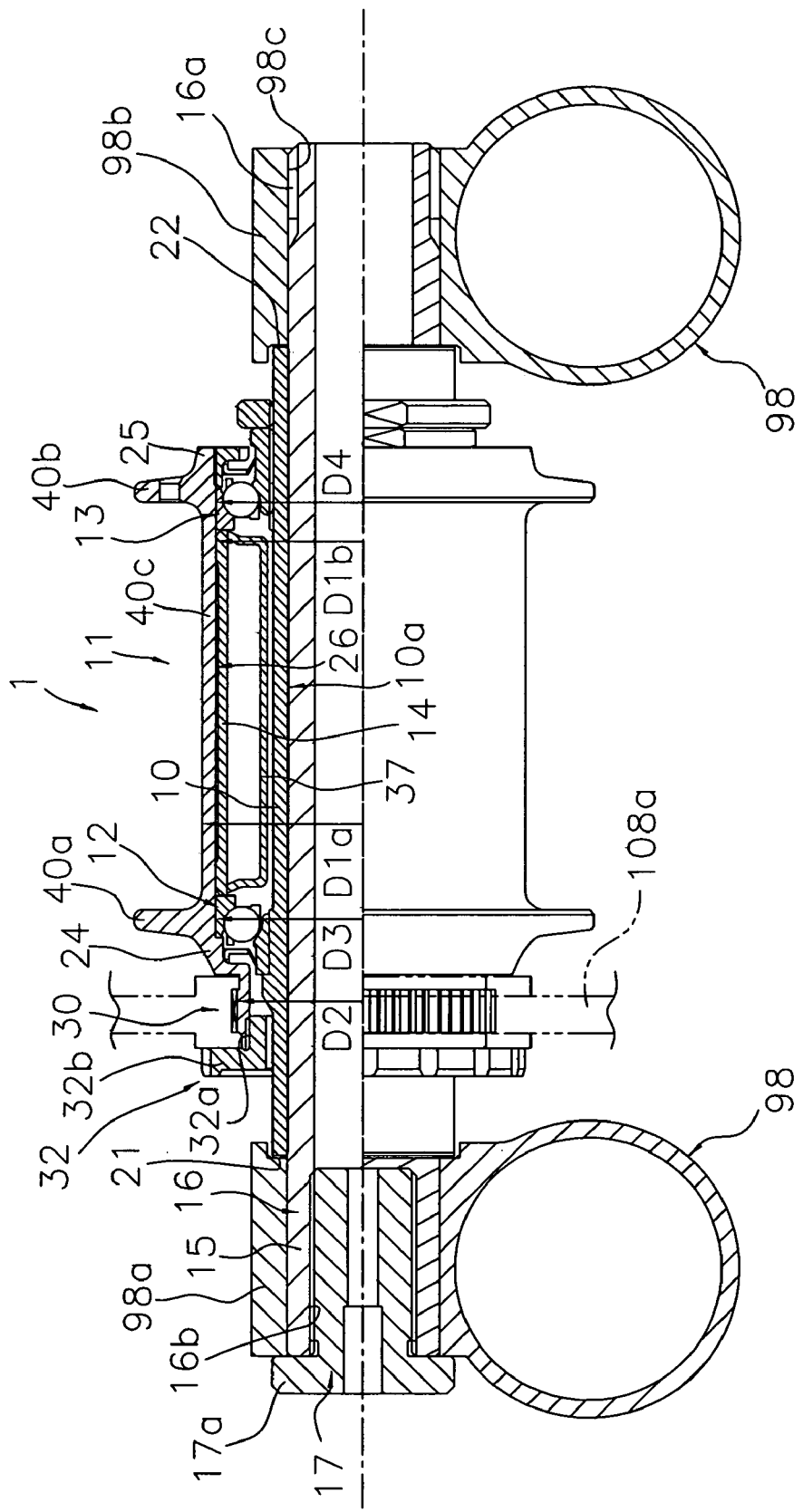
FIG. 2 is a longitudinal cross-sectional view of an upper portion of a front hub in accordance with the first embodiment of the present invention.

The front hub 1 includes a hub axle 10 mounted on a pair of axle attachment portions 98a and 98b provided at the bottom end of the suspension fork 98, a hub shell 11 disposed on the outer peripheral side of the hub axle 10, a rotor attachment portion 30, a first bearing 12 and second bearing 13 disposed between the hub axle 10 and the hub shell 11, and a spacer 14, as shown in FIG. 2.

The hub axle 10 is a substantially cylindrical member having a center hole 10a. The hub axle 10 is non-rotatably mounted between the pair of left and right axle attachment portions 98a and 98b of the suspension fork 98 by fastening an attachment bolt 15 (one example of an attachment axle) disposed to pass through the center hole 10a.

The attachment bolt 15 is an accessory of the suspension fork 98. The attachment bolt 15 has a cylindrical main bolt body 16, and a head member 17 threadedly fixed to the main bolt body 16, for example. The outer peripheral surface of the main bolt body 16 has male threads 16a at its distal end, while the inner peripheral surface of the main bolt body 16 has female threads 16b at its proximal end. The male threads 16a are threaded into female threads 98c that are formed in the axle attachment portion 98b. The head member 17 is threaded into the female threads 16b. Thus, the head member 17 is threadedly fixed to the main bolt body 16 at the proximal end. The head member 17 is provided with a head part 17a that is larger than the main bolt body 16. The head member 17 is threadedly fixed in place in the female threads 16b. The head part 17a is interlocked with the axle attachment portion 98a in a state in which the male threads 16a is screwed into the axle attachment portion 98b, whereby the hub axle 10 is non-rotatably held in place between the axle attachment portions 98a and 98b.

The hub axle 10 has a first axle end 21, a second axle end 22, and a center axis extending between the first axle end 21 and the second axle end 22 as shown by the single-dashed line in FIG. 2. The outer peripheral surface of the hub axle 10 is provided with a first inner race attachment portion 18 (see FIG. 3) positioned on the first axle end 21 of the hub axle 10, and a second inner race attachment portion 19 (see FIG. 4) positioned on the second axle end 22.

The first inner race attachment portion 18 is a portion to which a first inner race 51 of the first bearing 12 is attached, as will be described later. A first inner race positioning portion 20 is also provided adjacent to the first axle end 21 of the first inner race attachment portion 18. The first inner race positioning portion 20 protrudes radially outward from the outer peripheral surface of the hub axle 10. The first inner race positioning portion 20 has a contact surface 20a that comes in contact with the first inner race 51 on the side of first axle end 21 and restricts the movement of the first inner race 51 towards the first axle end 21.

The second inner race attachment portion 19 is a portion of the second bearing 13 to which a second inner race 56 and a second locking member 23 are attached, as will be described later. The second inner race attachment portion 19 has male threads 19a for releasably attaching the second inner race 56 thereto.

The outer peripheral surface of the hub axle 10 is largest in outside diameter at the first inner race positioning portion 20. In other words, the first inner race positioning portion 20 has the maximum outside diameter of the hub axle 10. The outside diameter of the portion between the first inner race positioning portion 20 and the second axle end 22 is either the same as the outside diameter of the first inner race attachment portion 18 or is less than the outside diameter of the first inner race attachment portion 18. Therefore, the first inner race 51 and the second inner race 56 can be attached to the hub axle 10 on the second axle end 22.

The hub shell 11 is mounted on the outer periphery of the hub axle 10 and is capable of rotating about the hub axle 10. The hub shell 11 has a first shell end 24, a second shell end 25, a pair of flanges 40a and 40b, a tubular portion 40c. The flanges 40a and 40b are disposed at a distance apart in the axial direction and that interlock with the spokes 99. The tubular portion 40c is provided between the pair of flanges 40a and 40b. The first shell end 24 is provided on the outer side of the flange 40a and constitutes one end of the hub shell 11. The second shell end 25 is provided on the outer side of the flange 40b and that constitutes the other end of the hub shell 11, as shown in FIG. 2. The hub shell 11 is also provided with an internal passage 26 through which the hub axle 10, the first bearing 12, the second bearing 13, the spacer 14, and other components are inserted.

Figure 3:
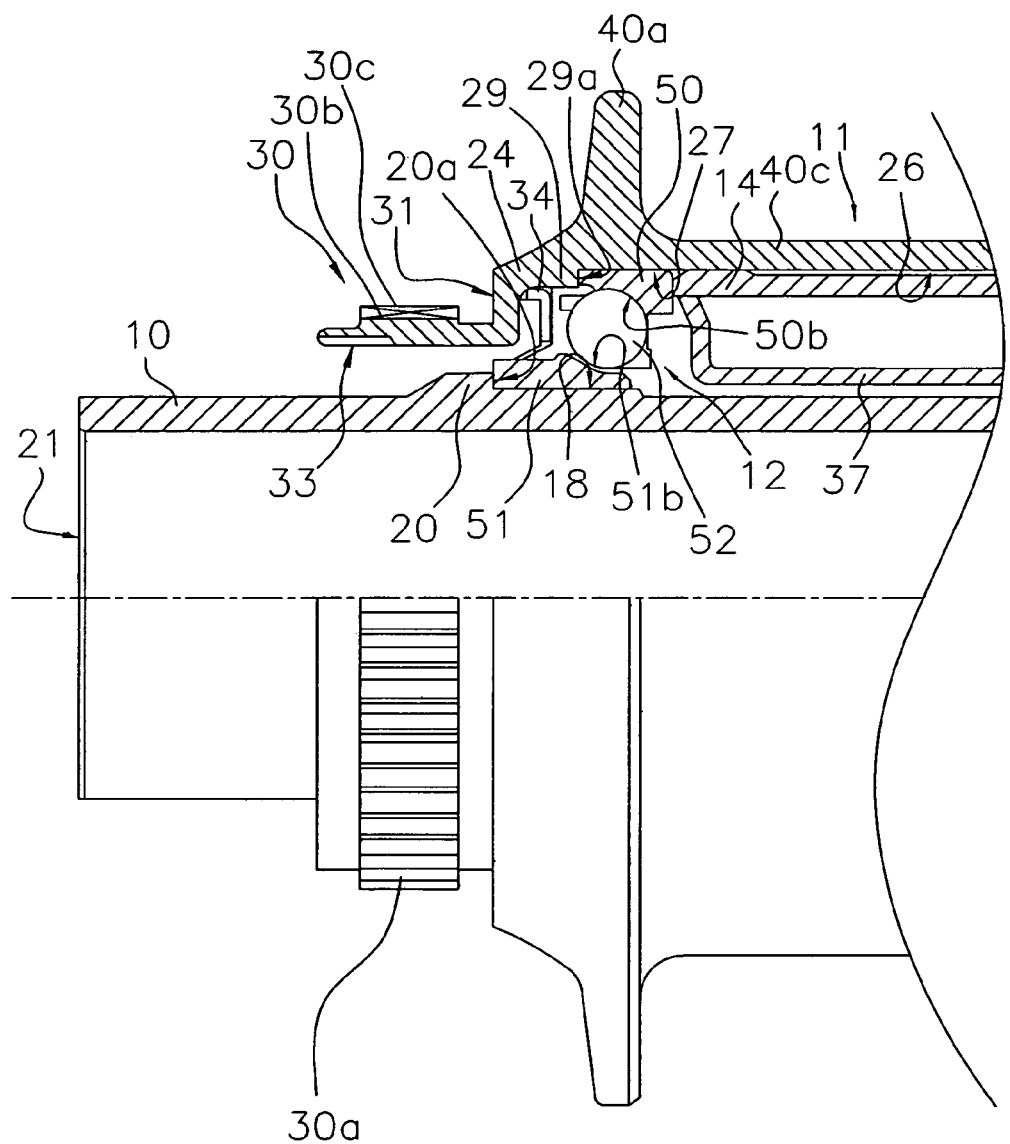
FIG. 3 is an enlarged partial cross-sectional view of the left side of the front hub illustrated in FIG. 2.
Figure 4:
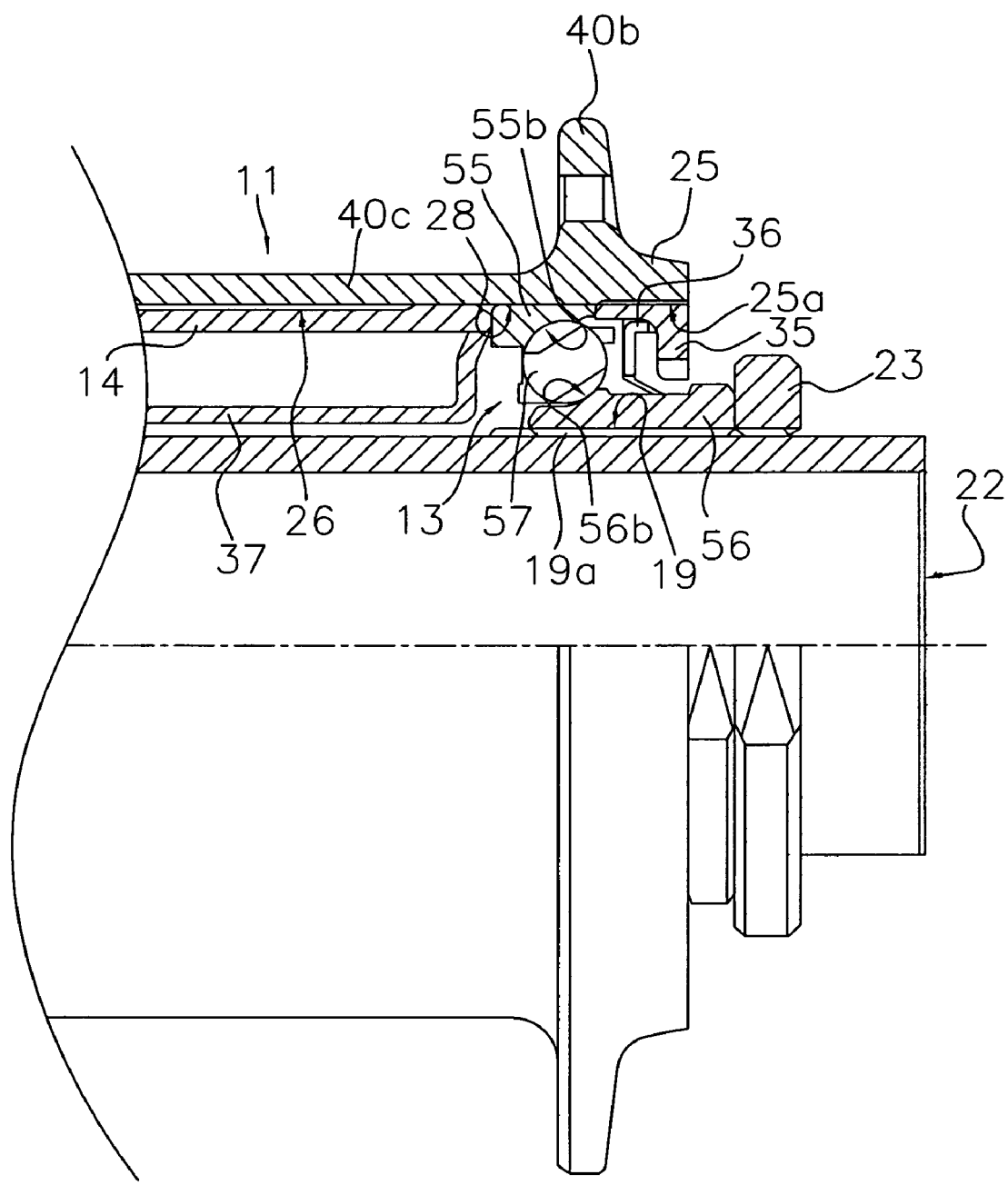
FIG. 4 is an enlarged partial view of the right side of the front hub illustrated in FIG. 2.

The inner peripheral surface of the hub shell 11 is provided with a first outer race attachment portion 27 (see FIG. 3) and a second outer race attachment portion 28 (see FIG. 4). The first outer race attachment portion 27 is positioned on the first shell end 24 of the hub shell 11. The second outer race attachment portion 28 is positioned on the second shell end 25.

The first outer race attachment portion 27 (first bearing engagement surface) faces a below-described first outer race 50 of the first bearing 12. The first outer race 50 is press-fitted into the first outer race attachment portion 27. An outer race positioning portion 29 is provided adjacent to the first shell end 24 of the first outer race attachment portion 27. The outer race positioning portion 29 is formed to be smaller in diameter than the first outer race attachment portion 27. The outer race positioning portion 29 is positioned on the axially inner side of the first shell end 24. The outer race positioning portion 29 has a contact surface 29a that comes in contact with the first outer race 50 on the side of the first shell end 24. The contact surface 29a restricts the movement of the first outer race 50 towards the first shell end 24.

The second outer race attachment portion 28 (second bearing engagement surface) faces a below-described second outer race 55 of the second bearing 13. The second outer race 55 is press-fitted into the second outer race attachment portion 28. The second shell end 25 of the second outer race attachment portion 28 is provided with female threads 25a. The female threads 25a are positioned on the inner side of the second shell end 25.

The inside diameter D4 of the second outer race attachment portion 28 is greater than the inside diameter D3 of the first outer race attachment portion 27 by a prescribed distance or spacing, e.g., 0.2 mm to 1.0 mm, preferably 0.3 mm to 0.5 mm, and more preferably 0.4 mm in the present embodiment. The second shell end 25 and the portion of the inner peripheral surface of the hub shell 11 that lies between the first outer race attachment portion 27 and the second outer race attachment portion 28 are formed to have an inside diameter either equal to or greater than the inside diameter D4 of the second outer race attachment portion 28. Therefore, the internal passage 26 of the hub shell 11 is shaped so as to allow the internal components of the hub shell 11 that include the first bearing 12 and the second bearing 13 to be inserted from the second axle end 22.

The rotor attachment portion 30 is a portion to which a rotor 108a of a disc brake device 108 is attached. The rotor attachment portion 30 is preferably formed integrally with the first shell end 24 of the hub shell 11, as shown in FIG. 2. The rotor attachment portion 30 can also instead have a structure that is configured separately from the hub shell 11 and is integrally fixed in place on the first shell end 24. The rotor attachment portion 30 has an outside diameter D2 that is less than the outside diameter D1a of the tubular portion 40c. In the present embodiment, the outside diameter D2 of the rotor attachment portion 30 is also less than the inside diameter D1b of the tubular portion 40c and the inside diameter of the first shell end 24. Thus, by configuring the outside diameter D2 of the rotor attachment portion 30 to be less not only than the outside diameter D1a of the tubular portion 40c, but also than the inside diameter D1b, the diameter of the hub axle can be increased to improve rigidity while more effectively preventing an increase in the diameter of the rotor attachment portion 30. Specifically, the rotor attachment portion 30 has a splined section 30a that has protuberances disposed at intervals in the circumferential direction to define a plurality of axially extending splines. The rotor attachment portion 30 is configured so that the outside diameter of the bottom part 30b (see FIG. 3) of the splined section 30a is equivalent to the outside diameter D2 of the rotor attachment portion 30, but is less than the inside diameter D1b of the tubular portion 40c. It is even more preferable that the outside diameter not only of the bottom part 30b of the splined section 30a, but also of the peak 30c of the splined section 30a be configured so as to be smaller than the inside diameter D1b of the tubular portion 40c. The inside diameter of the rotor attachment portion 30 is also greater than the outside diameter of the hub axle 10, and preferably is also greater than the outside diameter of the first inner race 51 (see FIG. 3), described later.

A step 31 is formed in the portion where the rotor attachment portion 30 and the first shell end 24 connect, and this step 31 constitutes a contact surface with which the rotor 108a comes in contact, as shown in FIG. 3. The inner peripheral surface of the rotor attachment portion 30 is provided with female threads 33. A rotor locking member 32 (see FIG. 2) is threaded into the female threads 33 to fix the rotor 108a in place. The rotor 108a is attached to the rotor attachment portion 30 and is held between the step 31 and the rotor locking member 32, whereby the rotor is non-rotatably fixed in place to the rotor attachment portion 30.

The rotor locking member 32 has a first cylindrical portion 32a having in its outer peripheral surface a male screw that is threaded into the female threads 33 of the rotor attachment portion 30, and a second cylindrical portion 32b that has a greater outside diameter than the first cylindrical portion 32a and that comes in contact with the rotor 108a, as shown in FIG. 2. Splines that extend in the axial direction are provided in the outer peripheral surface of the second cylindrical portion 32b.

The first bearing 12 is provided between the hub axle 10 and the hub shell 11, so as to support one end of the hub shell 11; i.e., the portion on the side of the first shell end 24, in a rotatable manner about the hub axle 10. The first bearing 12 has a first outer race 50, a first inner race 51 and first rolling members 52. The first outer race 50 is attached to the first outer race attachment portion 27 of the hub shell 11. The first inner race 51 is attached to the first inner race attachment portion 18 of the hub axle 10. The first rolling members 52 are located between the first outer race 50 and the first inner race 51.

The first outer race 50 has a ball bearing surface 50b that is a curved surface that curves radially inward. The first outer race 50 is disposed so as to be sandwiched between the contact surface 29a and the spacer 14, and is restricted from moving in the axial direction by the contact surface 29a and the spacer 14.

The first inner race 51 has a ball pressing surface 51b that is a curved surface that curves radially outward. The first inner race 51 is pressed in and fixed in place by the first inner race attachment portion 18.

The first rolling members 52 are composed, for example, of spheres that are disposed at equal intervals in the circumferential direction via a retainer, and are also disposed between the first outer race 50 and the first inner race 51.

A sealing member 34 is disposed on the first shell end 24 of the first rolling members 52, between the outer peripheral surface of the first inner race 51 and the inner peripheral surface of the first shell end 24.

The second bearing 13 is provided between the hub axle 10 and the hub shell 11, so as to support the other end of the hub shell 11; i.e., the portion on the side of the second shell end 25, in a rotatable manner about the hub axle 10, as shown in FIG. 4. The second bearing 13 has a second outer race 55, a second inner race 56 and second rolling members 57. The second outer race 55 is attached to the second outer race attachment portion 28 of the hub shell 11. The second inner race 56 attached to the second inner race attachment portion 19 of the hub axle 10. The second rolling members 57 are disposed between the second outer race 55 and the second inner race 56.

The second outer race 55 has a ball bearing surface 55b that is a curved surface that curves radially inward. The second outer race 55 is disposed so as to be sandwiched between the spacer 14 and a first locking member 35, and is restricted from moving in the axial direction by the spacer 14 and the first locking member 35. The first locking member 35 is threaded into the female screw 25a formed in the inner peripheral surface of the second shell end 25. The outside diameter of the second outer race 55 is greater than the outside diameter of the first outer race 50; i.e., the outside diameter of the second bearing 13 is greater than the outside diameter of the first bearing 12 by, e.g., 0.2 mm to 1.0 mm, preferably 0.3 to 0.5 mm, and 0.4 mm in the present embodiment.

The second inner race 56 has a ball pressing surface 56b that is a curved surface that curves radially outward. The end surface of the second inner race 56 on the side of the second shell end 25 protrudes outward from the second shell end 25 of the hub shell 11, and is in contact with the second locking member 23. The second locking member 23 is threaded over the male threads 19a formed in the outer peripheral surface of the hub axle 10.

The second rolling members 57 are composed, for example, of spheres that are disposed at equal intervals in the circumferential direction by means of a retainer, and are disposed between the second outer race 55 and the second inner race 56.

A sealing member 36 is provided between the second rolling members 57 and the first locking member 35, and between the outer peripheral surface of the second inner race 56 and the inner peripheral surface of the second locking member 23.

The spacer 14 is provided between the first bearing 12 and the second bearing 13 in the axial direction. The spacer 14 is used to maintain the distance between the first bearing 12 and the second bearing 13. The spacer 14 is positioned radially inwardly in relation to the tubular portion 40c of the hub shell 11, and has a cylindrical shape with an outside diameter that is either the same or slightly less than the inside diameter of the tubular portion 40c. The presence of this spacer 14 eliminates the need to form a contact surface for positioning the bearings in the axial direction by using the inner peripheral surface of the hub shell 11 as a step. A tube 37 for preventing grease loss is provided between the spacer 14 and the hub axle 10.

The assembly procedure for the front hub 1 configured as described above will now be described with reference to FIGS. 2 through 4.

First, the sealing member 34, the first rolling members 52 held by a retainer, and the first outer race 50 are inserted in this order into the internal passage 26 of the hub shell 11 from the second shell end 25. These parts are pushed in all the way toward the first shell end 24 so that the first outer race 50 is press-fitted to the first outer race attachment portion 27. Next, the spacer 14 and the tube 37 are inserted into the internal passage 26 of the hub shell 11 from the second shell end 25. The second outer race 55 is subsequently inserted into the internal passage 26 of the hub shell 11 from the second shell end 25, and the second outer race 55 is press-fitted to the second outer race attachment portion 28. The second rolling members held by a retainer are inserted into the internal passage 26 of the hub shell 11 from the second shell end 25. Then the first locking member 35 is screwed into and fixed to the second shell end 25 in a state in which the sealing member 36 is attached to the inner peripheral surface. The internal components attached in the interior of the hub shell 11 are inserted into the internal passage 26 from the second shell end 25 in this manner. Grease is then filled into the first bearing 12 and the second bearing 13.

Next, the hub axle 10 is attached to the assembled hub shell 11 in the state described above. The first inner race 51 is first attached to the first inner race attachment portion 18 of the hub axle 10. The first inner race 51 is incorporated into the hub axle 10 from the second axle end 22 of the hub axle 10; i.e., from the second shell end 25 in the hub shell 11, and is pressed in and fixed to the first inner race attachment portion 18.

When the hub axle 10 is attached to the assembled hub shell 11, the hub axle 10 with the first inner race 51 attached thereto is inserted into the internal passage 26 of the hub shell 11 from the first shell end 24, resulting in a state in which the second axle end 22 of the hub axle 10 protrudes axially outward from the second shell end 25. Next, the second inner race 56 is attached to the second inner race attachment portion 19 from the second axle end 22 of the hub axle 10, and its axial position is adjusted. The second locking member 23 is then attached to the second inner race attachment portion 19 from the second axle end 22 of the hub axle 10, and the second inner race 56 is locked in place.

Figure 5:
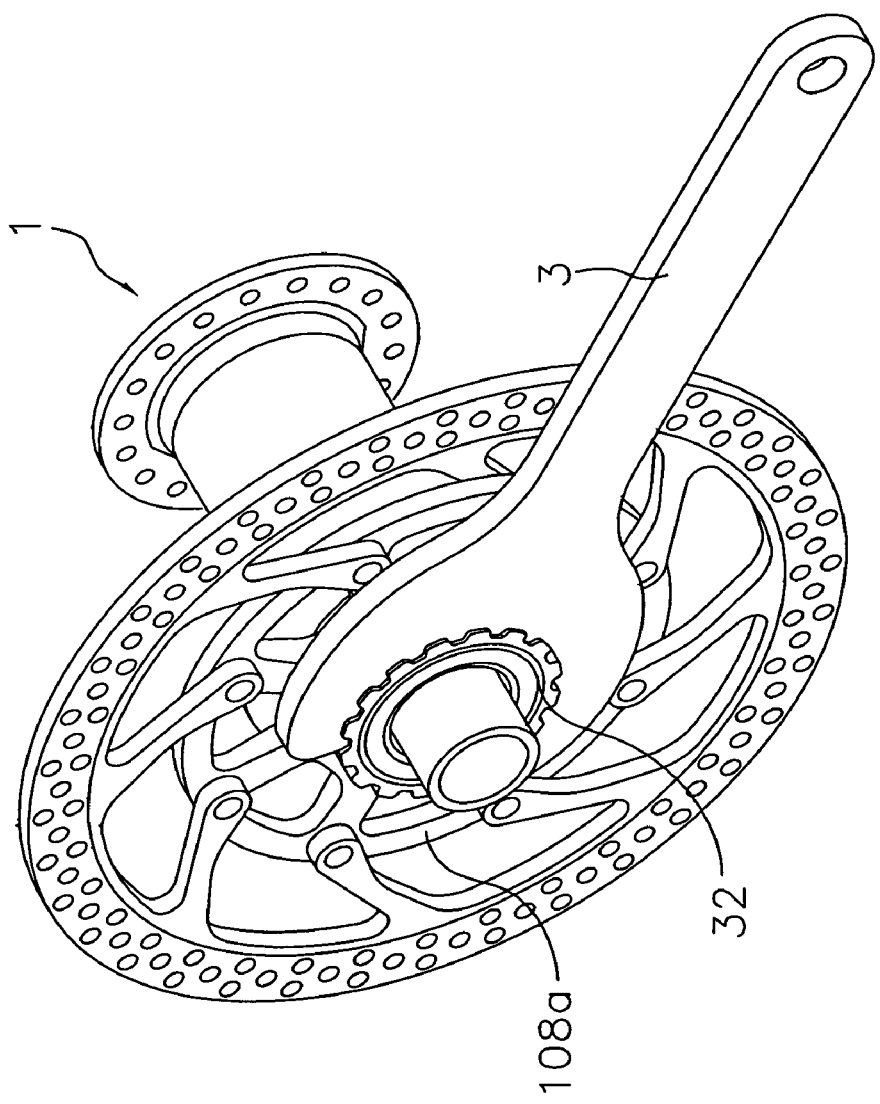
FIG. 5 is a perspective view of the front hub illustrated in FIGS. 2 to 4 showing a rotor being attached to the front hub.
Figure 6:
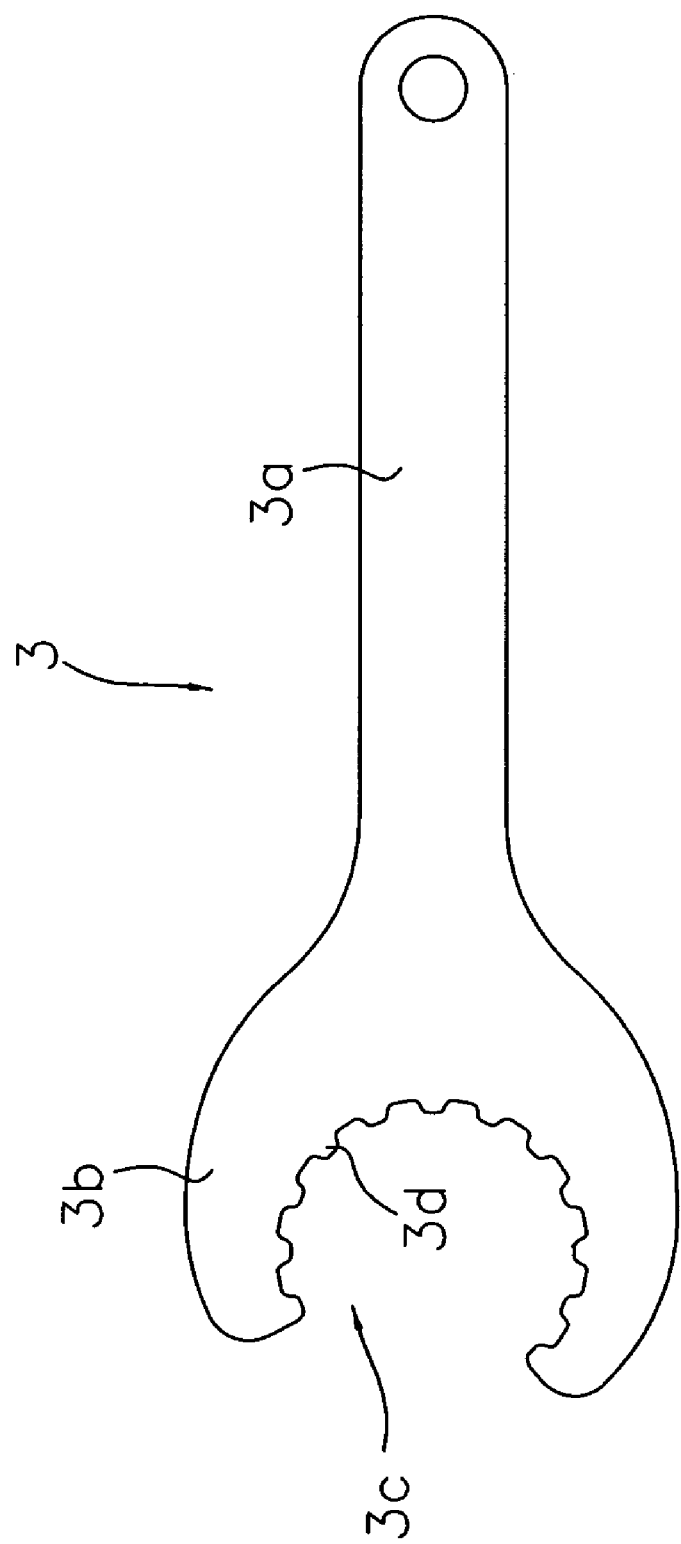
FIG. 6 is a side elevational view of the attachment tool used for attaching rotor to the front hub as illustrated in FIG. 5.

When the rotor 108a is mounted on the front hub 1 that has been assembled in this manner, first, the rotor 108a is fitted onto the rotor attachment portion 30, and then the rotor locking member 32 is attached to the rotor attachment portion 30 and is fastened by an attachment tool 3 (see FIG. 5). This attachment tool 3 has a handheld portion 3a and a head portion 3b provided at the distal end of the handheld portion 3a. An arcuate concave portion 3c that fits over the outer peripheral surface of the rotor locking member 32 is provided in the head portion 3b, as shown in FIG. 6. Protuberances 3d are formed in the concave portion 3c to mesh with the grooves provided in the outer peripheral surface of the rotor locking member 32.

In this front hub 1, the outside diameter D2 of the rotor attachment portion 30 is less than the outside diameter D1a of the tubular portion 40c of the hub shell 11. Therefore, the diameter D2 of the rotor attachment portion 30 can be prevented from increasing when the hub shell 11 is increased in diameter together with the hub axle 10. It is thereby possible with this front hub 1 to prevent the inside diameter of the disc brake rotor 108a from increasing when the hub axle 10 is increased in diameter.

It is difficult to attach the internal components of the hub shell 11, including the first bearing 12, from the side of the rotor attachment portion 30, i.e., from the first shell end 24 side of the hub shell 11, if the outside diameter D2 of the rotor attachment portion 30 is less than the outside diameter D1a of the tubular portion 40c of the hub shell 11, and the inside diameter of the rotor attachment portion 30 is less than both the inside diameter D1b of the tubular portion 40c of the hub shell 11 and the inside diameter of the first shell end 24.

However, in this front hub 1, all of the internal components of the hub shell 11 can be attached from the opposite side of the rotor attachment portion 30; i.e., from the second shell end 25 side of the hub shell 11. Also, inserting the spacer 14 between the first bearing 12 and the second bearing 13 makes is possible to maintain the distance between the first bearing 12 and the second bearing 13, and to dispose the first bearing 12 and the second bearing 13 at specific positions. Therefore, the internal components of the hub shell 11 can be easily attached even if the outside diameter D2 of the rotor attachment portion 30 is relatively small.

In this front hub 1, the inside diameter D4 of the second outer race attachment portion 28 is greater than the inside diameter D3 of the first outer race attachment portion 27 as previously described. Also, the outside diameters of the first outer race 50 and the second outer race 55 are such that the outside diameter of the second outer race 55 is greater than the outside diameter of the first outer race 50 in accordance with the difference between the inside diameter D3 of the first outer race attachment portion 27 and the inside diameter D4 of the second outer race attachment portion 28, as described above. Therefore, when the first outer race 50 is passed through the second outer race attachment portion 28, the outer peripheral surface of the first outer race 50 does not come in contact with the second outer race attachment portion 28. Alternatively, the first outer race can be passed through while in contact with a lower pressure than when the second outer race 55 is pressed in by the second outer race attachment portion 28. Therefore, the second outer race attachment portion 28 is not damaged by the outer race 50 of the first bearing 12 when the first bearing 12 is inserted into the internal passage 26 of the hub shell 11 before the outer race of the second bearing 13 is inserted.

Second Embodiment

Figure 7:
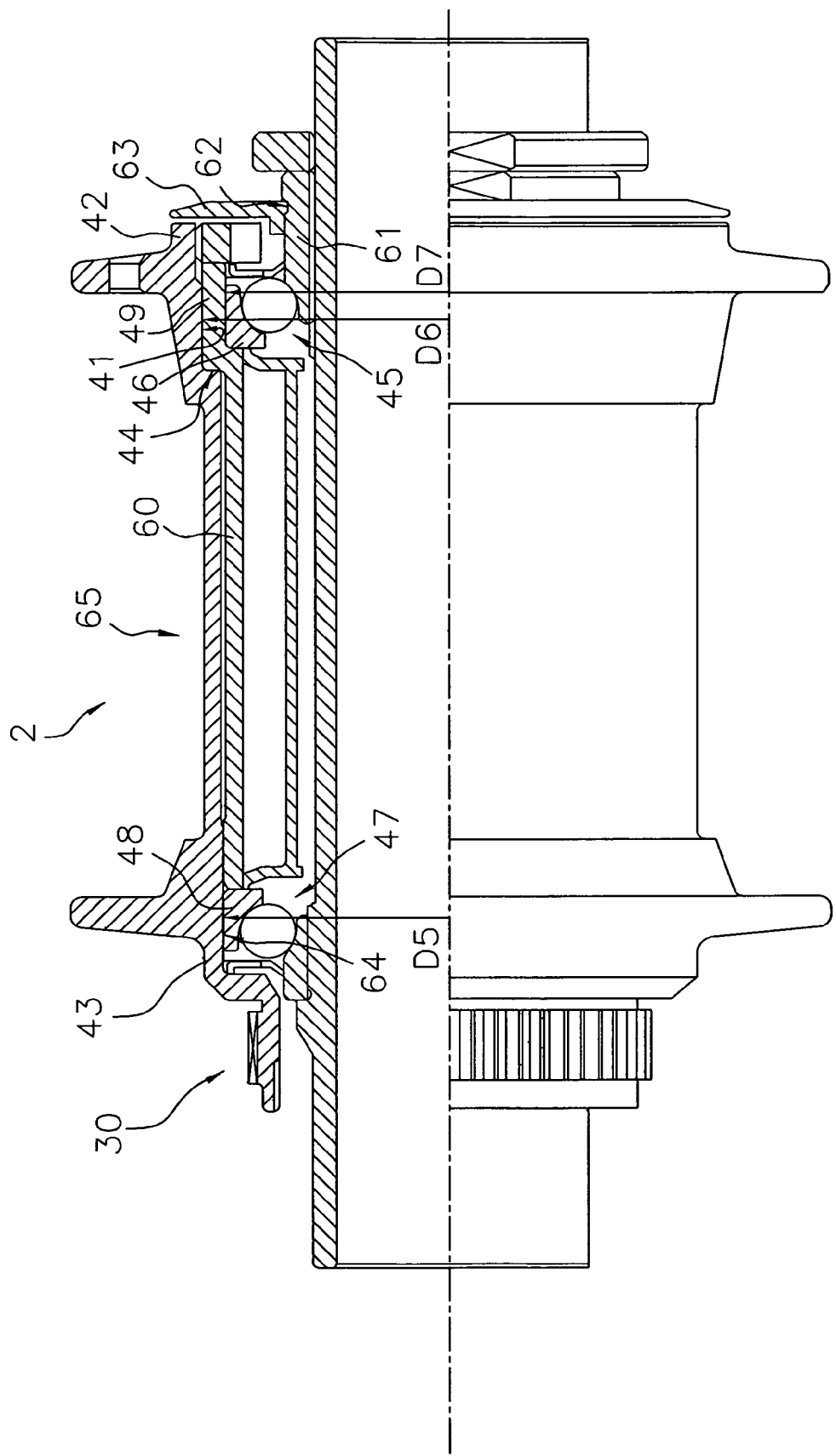
FIG. 7 is a longitudinal cross-sectional view of an upper portion of a front hub in accordance with a second embodiment of the present invention.

Referring now to FIG. 7, a front hub 2 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the front hub 2, the inside diameter D6 of a second outer race attachment portion 41 (second bearing engagement surface) and the inside diameter of a second end 42 are greater than the inside diameter of the portion on the side having a first shell end 43, and the inside diameter D6 of the second outer race attachment portion 41 is greater than the inside diameter D5 of a first outer race attachment portion 64 (first bearing engagement surface). A step 44 is formed in the second end 42 side of the second outer race attachment portion 41 by the difference in inside diameters.

Furthermore, the outside diameter of a second outer race 46 of a second bearing 45 is equal to the outside diameter of a first outer race 48 of a first bearing 47, and the outside diameter of the second outer race 46 is also less than the inside diameter of the second outer race attachment portion 41. An intermediate member 49 is therefore provided between the outer peripheral surface of the second outer race 46 and the second outer race attachment portion 41. The inside diameter D7 of the intermediate member 49 is approximately the same as the outside diameter of the second outer race 46, and the second outer race 46 is press-fitted into the inner side of the intermediate member 49. The intermediate member 49 is formed integrally with a spacer 60 and has a stepped shape that coincides with the step 44 in the inner peripheral surface of a hub shell 65.

An interlocking groove 62 is provided in the portion of a second inner race 61 that protrudes outward from the second end 42 of the hub shell 65, and a cover member 63 that covers the end surface of the second end 42 is attached in this interlocking groove 62.

The rest of the configuration and the assembly procedure are the same as the front hub 1 according to the first embodiment.

The same effects as those of the front hub 1 in the first embodiment can be achieved with the front hub 2. Also, since the difference between the inside diameter D5 of the first outer race attachment portion 64 and the inside diameter D6 of the second outer race attachment portion 41 is offset by the intermediate member 49, bearings having the same outside diameter can be used as the first bearing 47 and the second bearing 45. Furthermore, since the intermediate member 49 and the spacer 60 are formed integrally, they are easily attached to the hub shell 65.

In the second embodiment described above, the spacer 60 and the intermediate member 49 are formed integrally, but the spacer may also be a separate member. However, it is preferable that they be formed integrally to facilitate attachment to the hub shell 65.

Third Embodiment

Figure 8:
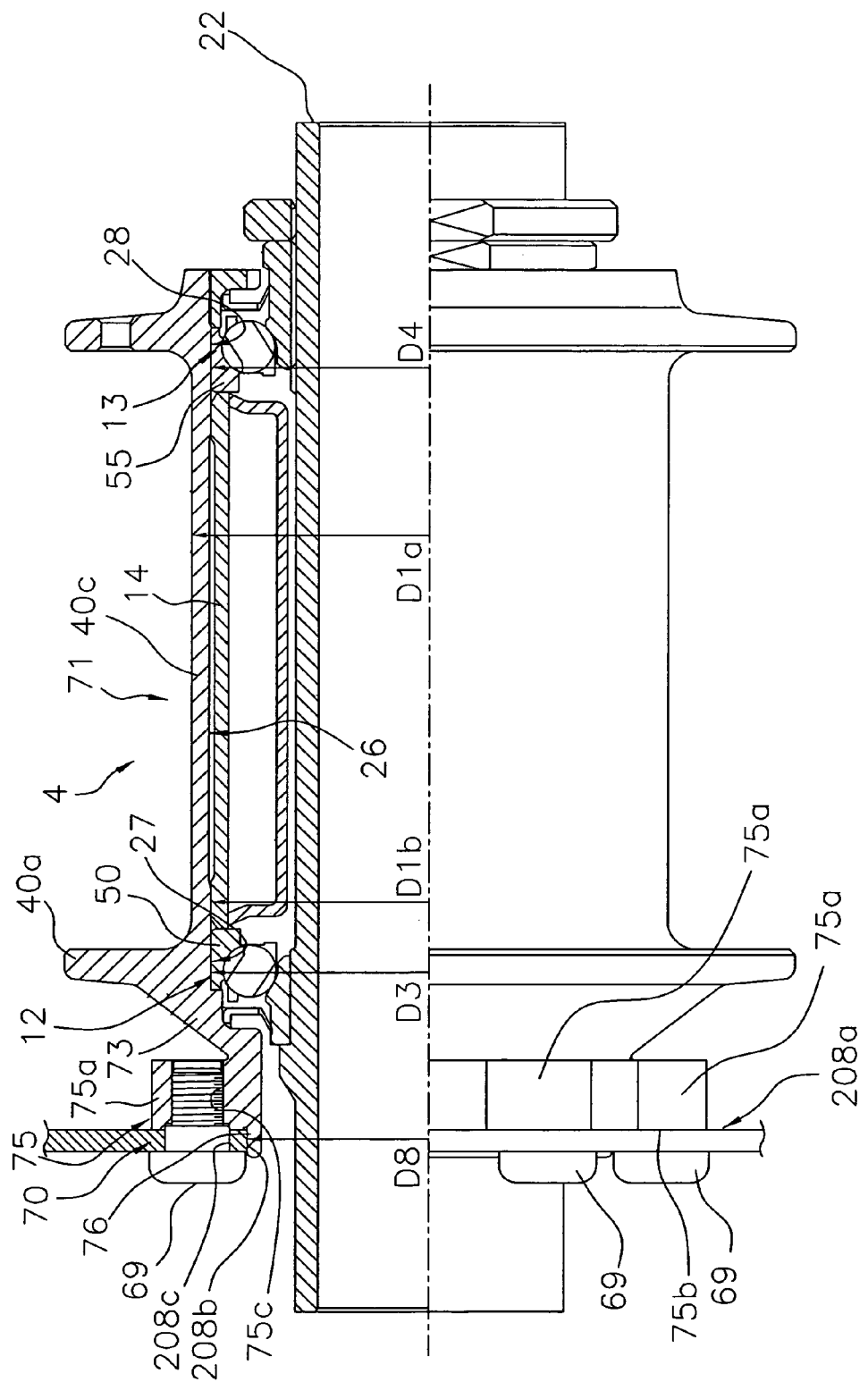
FIG. 8 is a longitudinal cross-sectional view of an upper portion of a front hub in accordance with a third embodiment of the present invention.
Figure 9:
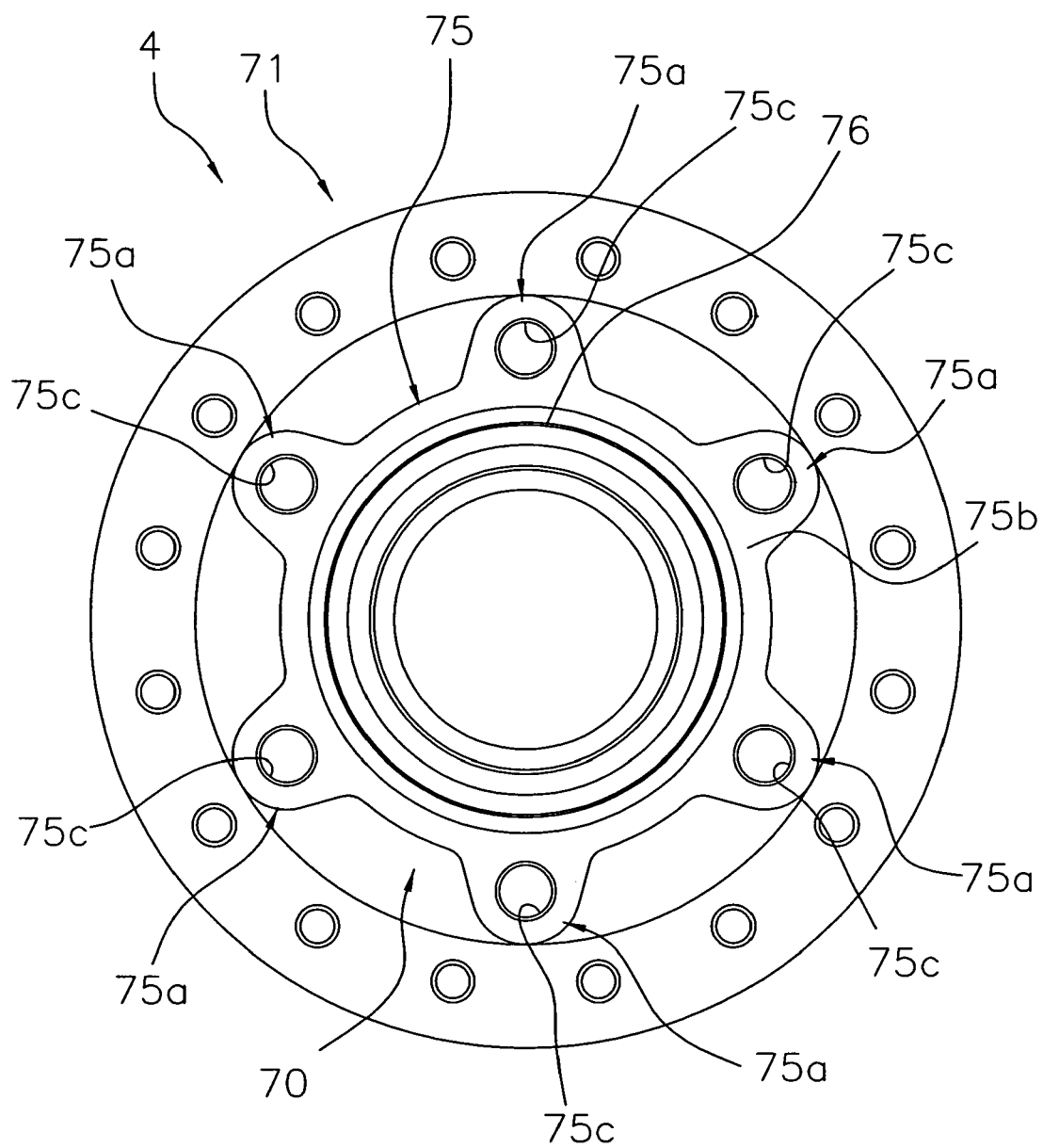
FIG. 9 is a cross-sectional view the front hub in accordance with the third embodiment of the present invention.

Referring now to FIGS. 8 and 9, a front hub 4 in accordance with a third embodiment will now be explained. In view of the similarity between the prior embodiments and third embodiment, the parts of the third embodiment that are identical to the parts of the prior embodiments will be given the same reference numerals as the parts of the prior embodiments. Moreover, the descriptions of the parts of the third embodiment that are identical to the parts of the prior embodiments may be omitted for the sake of brevity.

In the first and second embodiments, a rotor 208a is disposed in the rotor attachment portion 30, concentrically with the hub axle. The rotor 208a is fixed in place by the rotor locking member 32 that is threaded into the inner peripheral surface of the rotor attachment portion 30, but the fixing method is not limited to the methods in these embodiments.

The front hub 4 of the third embodiment has the same configuration as that of the first embodiment, except for a rotor attachment portion 70 is provided with the outside diameter of the second bearing 13 being greater than the outside diameter of the first bearing 12, as shown in FIG. 8. Specifically, the outside diameter of the second outer race 55 is greater than the outside diameter of the first outer race 50, and the inside diameter D4 of the second outer race attachment portion 28 is greater than the inside diameter D3 of the first outer race attachment portion 27. Therefore, the internal passage 26 of a hub shell 71 is shaped to allow the internal components of the hub shell 71, including the first bearing 12 and the second bearing 13, to be easily inserted from the side with the second axle end 22.

The rotor 208a can be non-rotatably fixed to the rotor attachment portion 70 by bolt members 69 (six, for example). Specifically, the rotor attachment portion 70 of the hub shell 71 has a first shell end 73 with a rotor attachment flange portion 75 and a tube-shaped rotor centering portion 76. The tube-shaped rotor centering portion 76 is formed on the free end the rotor attachment flange portion 75 so as to extend outwardly from the outer end face of the hub shell 71. The rotor attachment flange portion 75 has a plurality (six) of bolt threading parts 75a and a rotor attachment surface 75b. The bolt threading parts 75a are located closer to the free end of the first shell end 73 than the flange 40a in the axial direction of the hub axle. The bolt threading parts 75a also protrude outwardly in the radial direction from the first shell end 73. The rotor attachment surface 75b is formed by the outside faces of the bolt threading parts 75a that face in the axial direction of the hub axle, as shown in FIGS. 8 and 9. Threaded holes 75c into which the bolt members 69 are threaded are formed in each of the bolt threading parts 75a.

The rotor 208a is a plate-shaped disc member that has a centrally located attachment hole 208b fitted over the outer peripheral surface of the rotor centering portion 76, and that has six attachment holes 208c in the outer peripheral side of the attachment hole 208b. When the attachment hole 208b in the rotor 208a is mounted over the rotor centering portion 76, the rotor 208a is disposed concentrically with the hub shell 71. The outside diameter D8 of the rotor centering portion 76 is less than the outside diameter D1a of the tubular portion 40c. In the third embodiment, the outside diameter D8 of the rotor attachment flange portion 75, which is also the outside diameter of the rotor attachment portion 70, is also less than the inside diameter of the tubular portion 40c.

When the rotor 208a is mounted on the front hub 4, which has been assembled in the same manner as in the first embodiment, the rotor 208a is first mounted on the rotor centering portion 76, and the attachment holes 208c are aligned with the threaded holes 75c. In this state, the six bolt members 69 are tightened in the threaded holes 75c using an Allen key, a wrench, or another suitable multipurpose tool. The rotor 208a is thereby fixed in place on the front hub 4.

The same effects as those of the front hub 1 in the first embodiment can also be achieved with the front hub 4. Also, the rotor 208a can easily be attached and removed because the rotor 208a can be fixed in place using a multipurpose tool.

In the third embodiment described above, six bolt members were used, but the number of bolt members is not limited to six and can be any number.

Fourth and Fifth Embodiments

Figure 10:
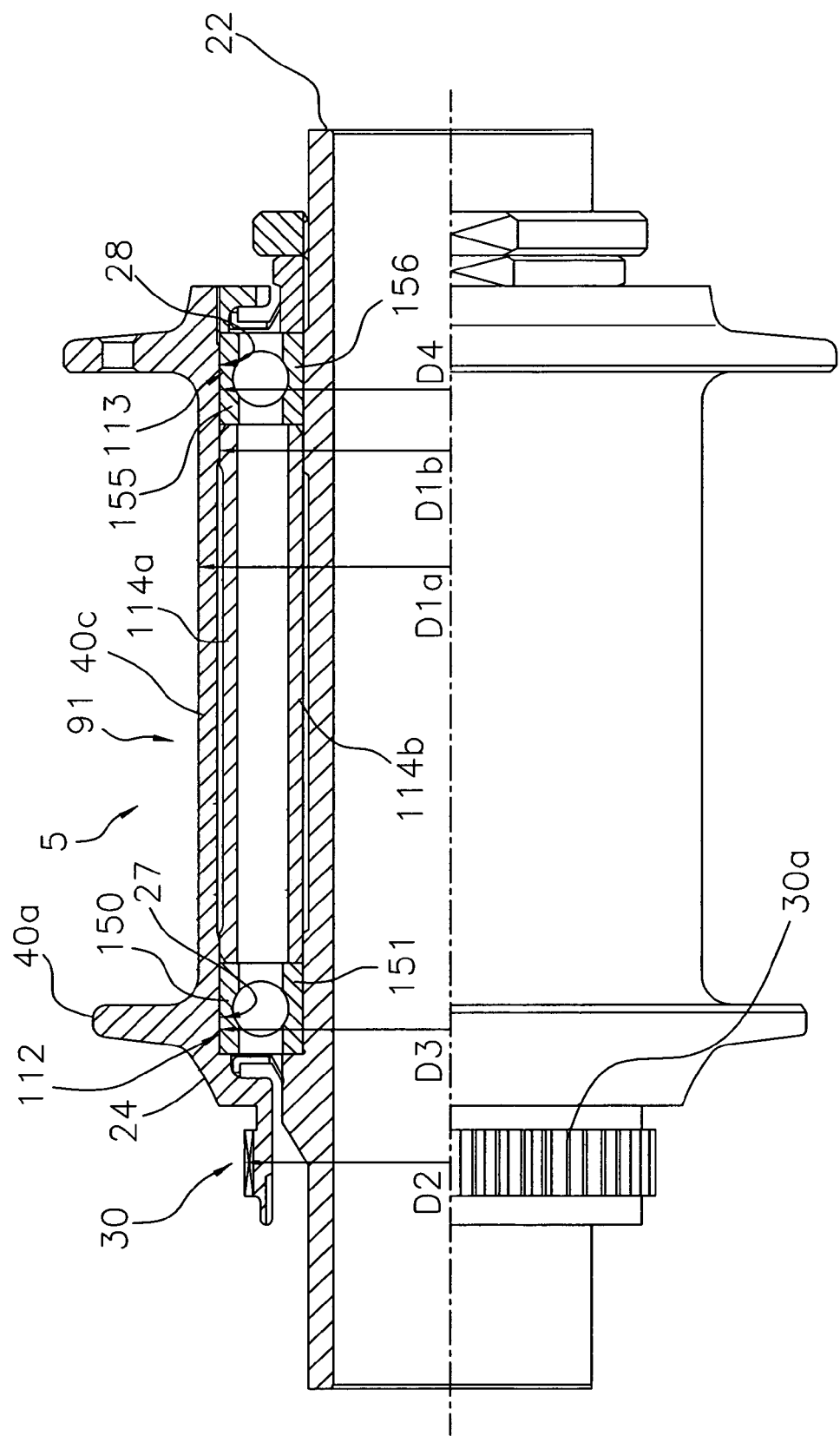
FIG. 10 is a longitudinal cross-sectional view of an upper portion of a front hub in accordance with another embodiment of the present invention.
Figure 11:
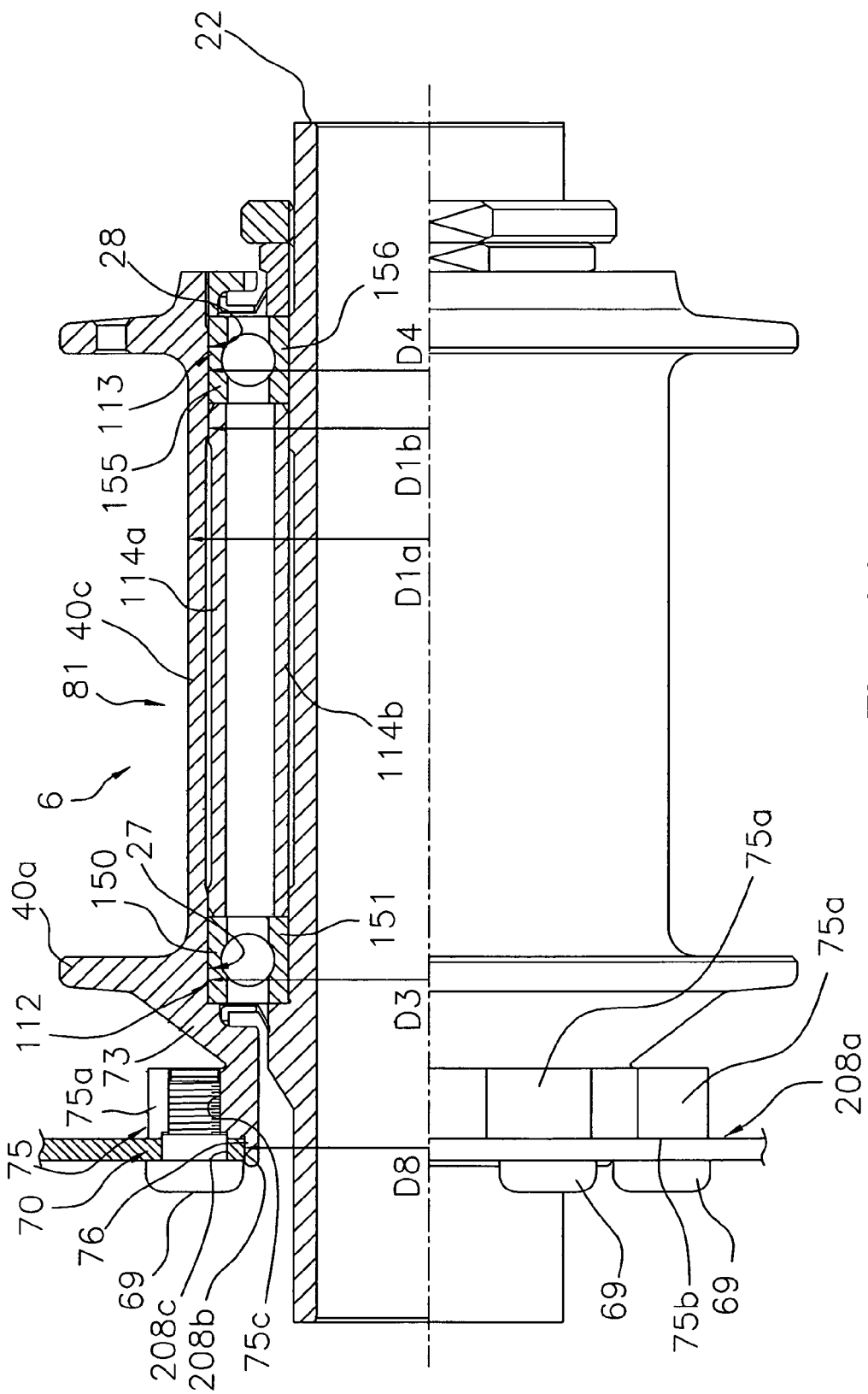
FIG. 11 is a longitudinal cross-sectional view of an upper portion of a front hub in accordance with yet another embodiment of the present invention.

Referring now to FIGS. 10 and 11, a pair of front hubs 5 and 6 in accordance with fourth and fifth embodiments will now be explained. In view of the similarity between the prior embodiments and fourth and fifth embodiments, the parts of the fourth and fifth embodiments that are identical to the parts of the prior embodiments will be given the same reference numerals as the parts of the prior embodiments. Moreover, the descriptions of the parts of the fourth and fifth embodiments that are identical to the parts of the prior embodiments may be omitted for the sake of brevity.

As shown in FIGS. 10 and 11, the hubs 5 and 6 have unitized commercial ball bearings as first and second bearings 112 and 113 for supporting the hub shells 81 and 91 of the hubs 5 and 6. In this case, an outside spacer 114a and an inside spacer 114b are disposed between the outer races 150 and 155 and inner races 151 and 156 of the first and second bearings 112 and 113. In this embodiment, the outside diameters of the first and second bearings 112 and 113 are equal, but the outside diameter of the second bearing 113 can also be made greater than the first bearing 112 to allow the first bearing to be mounted more easily.

Sixth Embodiment

Figure 12:
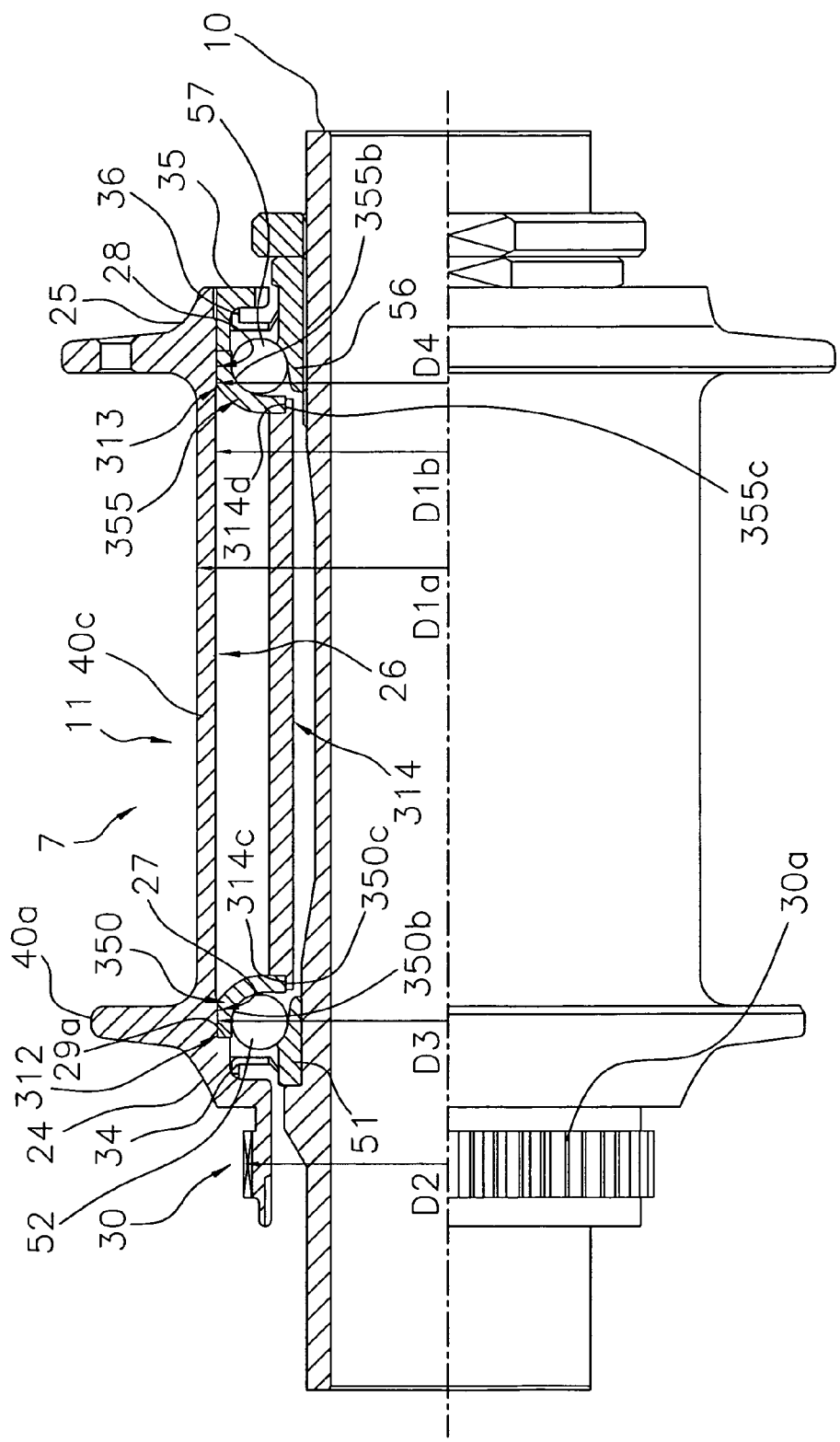
FIG. 12 is a longitudinal cross-sectional view of an upper portion of a front hub in accordance with yet another embodiment of the present invention.

Referring now to FIG. 12, a front hub 7 in accordance with a sixth embodiment will now be explained. In view of the similarity between the prior embodiments and third embodiment, the parts of the sixth embodiment that are identical to the parts of the prior embodiments will be given the same reference numerals as the parts of the prior embodiments. Moreover, the descriptions of the parts of the sixth embodiment that are identical to the parts of the prior embodiments may be omitted for the sake of brevity.

In the first and second embodiments, the spacer 14 and the tube 37 are mounted separately. However, it is also acceptable to configure a spacer 314 as shown in FIG. 12 such that it includes both a spacing function and a grease loss prevention function that are supplied by the spacer 14 and the tube 37 of the first and second embodiments.

In the embodiment shown in FIG. 12, the main features of the hub axle 10, the hub shell 11, and the rotor attachment portion 30 are the same as in the first embodiment and explanations thereof are omitted here for the sake of brevity. The main differences with respect to the first bearing 312 and the second bearing 313 lie in the shapes of the first outer race 350 and the second outer race 355. Otherwise, the constituent features of the first and second inner races 51 and 56 and the first and second rolling members 52 and 57 are substantially the same as in the first embodiment.

The first outer race 350 has a curved ball bearing surface 350b having a curved surface arranged on a radially inwardly facing side thereof. The first outer race 350 is arranged so as to be sandwiched between the contact surface 29a and the spacer 314 such that axial movement thereof is restricted by the contact surface 29a and the spacer 314. The second outer race 355 has a curved ball bearing surface 355b having a curved surface arranged on a radially inwardly facing side thereof. The outer race 355 is arranged so as to be sandwiched between the spacer 314 and the first locking member 35 such that axial movement thereof is restricted by the spacer 314 and the first locking member 35.

The first outer race 350 has a first spacer attachment portion 350c that extends radially inward from the ball bearing surface 350b, while the second outer race 355 has a second spacer attachment portion 355c that extends radially inward from the ball bearing surface 355b. The spacer 314 is mounted between the first and second spacer attachment portions 350c and 355c so as to be coaxial with respect to the hub axle 10.

The spacer 314 is a cylindrical member that can be made of resin, metal, or any of various other materials, but it is preferably made of an aluminum alloy or other lightweight metal. The spacer 314 is arranged to be close to the outer peripheral surface of the hub axle 10 such that the gap between the spacer 314 and the outer peripheral surface of the hub axle 10 is small. Stepped portions 314c and 314d are formed on both ends of the spacer 314 that are configured to mate with the first and second spacer attachment portions 350c and 355c, respectively. Each of the stepped portions 314c and 314d is configured to be annularly recessed from the outer peripheral surface of the respective end of the spacer 314.

The assembly procedure for the front hub 7 configured as described above will now be described. First, the sealing member 34, the first rolling members 52 held by the retainer, and the first outer race 350 are inserted in this order into the internal tube portion 26 of the hub shell 11 from the second shell end 25. These parts are pushed in all the way toward the first shell end 24 such that the first outer race 350 is press-fitted to the first outer race attachment portion 27. Next, the spacer 314 is inserted into the internal tube portion 26 of the hub shell 11 from the second shell end 25 side and the stepped portion 314c of the spacer 314 is fitted into the first spacer attachment portion 350c. The second outer race 355 is subsequently inserted into the internal tube portion 26 of the hub shell 11 from the second shell end 25, and the second outer race 355 is press-fitted to the second outer race attachment portion 28. At the same time, the stepped portion 314d of the spacer 314 is fitted into the second spacer attachment portion 355c. As a result, the spacer 314 is secured (fixed). The second rolling members 57 held by the retainer are then inserted toward the second outer race 355 from the second shell end 25, and the first locking member 35 is screwed into and fixed to the second shell end 25 in a state in which the sealing member 36 is attached to the inner peripheral surface thereof. In this way, all of the internal components attached in the interior of the hub shell 11 are inserted into the internal tube portion 26 from the second shell end 25. Grease is filled into the first bearing 312 and the second bearing 313. Otherwise, the procedure is the same as in the first embodiment and explanations of the subsequent steps are omitted here for the sake of brevity.

With this embodiment, the spacer 314 serves both to position the first and second outer races 350 and 355 in the axial direction and to prevent grease from flowing out of the first and second bearings 312 and 313, i.e., prevent grease loss from the first and second bearings 312 and 313. As a result, the structure of the front hub 7 can be simplified.

Other Embodiment

In the embodiments described above, a front hub was described as an example, but the present invention can also be applied to a rear hub.

In the embodiments described above, the inside diameter D4 of the second outer race attachment portion 28 of the hub shell 11 is greater than the inside diameter D3 of the first outer race attachment portion 27, but the inside diameter D4 of the second outer race attachment portion 28 can also be equal to the inside diameter D3 of the first outer race attachment portion 27. In this case, bearings having the same outside diameter can be used as the first the second bearings. However, it is preferable that the inside diameter D4 of the second outer race attachment portion 28 be greater than the inside diameter D3 of the first outer race attachment portion 27 as described above, in terms of preventing damage to the second outer race attachment portion 28 and making it easier to insert the first outer race.

GENERAL INTERPRETATION OF TERMS

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle disc brake hub comprising:
a hub axle including a first axle end and a second axle end with and a center axis extending between the first and second axle ends;
a hub shell including a tubular portion rotatably disposed on the hub axle, a first shell end being rotatably supported on the first axle end by a first bearing with a first flange disposed at a first tubular end of the tubular portion, and a second shell end being rotatably supported on the second axle end by a second bearing with a second flange disposed at a second tubular end of the tubular portion, the hub shell forming an internal passage with the hub axle, the first bearing and the second bearing disposed therein, with the internal passage being configured and dimensioned such that the first and second bearings are installed into the internal passage of the hub shell from the second shell end of the hub shell; and
a rotor attachment portion disposed at the first shell end, the rotor attachment portion having a maximum outside diameter that is less than a maximum outside diameter of the tubular portion, and a minimum inside diameter defined by the internal passage that is smaller than maximum outer diameters of the first and second bearings.

2. The bicycle disc brake hub according to claim 1, wherein the hub shell further includes a spacer disposed in the internal passage between the first and second bearings to maintain separation between the first and second bearings.

3. The bicycle disc brake hub according to claim 2, wherein the internal passage of the hub shell includes an inner peripheral surface with a first bearing engagement surface engaging the first bearing and a second bearing engagement surface engaging the second bearing, with the second bearing engagement surface having a greater inside diameter than the first bearing engagement surface.

4. The bicycle disc brake hub according to claim 3, wherein the second bearing has a greater outside diameter than the first bearing.

5. The bicycle disc brake hub according to claim 3, wherein the hub shell further includes an intermediate member disposed between an outer peripheral surface of the second bearing and the second bearing engagement surface of the hub shell, and the first and second bearings have outside diameters that are equal.

6. The bicycle disc brake hub according to claim 5, wherein the intermediate member is formed integrally with the spacer.

7. The bicycle disc brake hub according to claim 1, wherein the rotor attachment portion includes a plurality of protuberances circumferential spaced apart to define splines with a bottom diameter that is less than the maximum outside diameter of the tubular portion.

8. The bicycle disc brake hub according to claim 1, wherein the rotor attachment portion comprises a rotor attachment flange portion with a plurality of circumferential spaced apart bolt threading portions, and a rotor centering portion located on a side of the rotor attachment flange portion that is opposite to the first flange, the rotor centering portion having a smaller outside diameter than the maximum outside diameter the tubular portion.

9. The bicycle disc brake hub according to claim 1, wherein the rotor attachment portion includes a plurality of protuberances circumferential spaced apart to define splines with a bottom diameter that is less than the maximum outside diameter of the tubular portion.

10. The bicycle disc brake hub according to claim 1, wherein the rotor attachment portion comprises a rotor attachment flange portion with a plurality of circumferential spaced apart bolt threading portions, and a rotor centering portion located on a side of the rotor attachment flange portion that is opposite to the first flange, the rotor centering portion having a smaller outside diameter than the maximum outside diameter the tubular portion.

11. The bicycle disc brake hub according to claim 2, wherein the rotor attachment portion includes a plurality of protuberances circumferential spaced apart to define splines with a bottom diameter that is less than the maximum outside diameter of the tubular portion.

12. The bicycle disc brake hub according to claim 2, wherein the rotor attachment portion comprises a rotor attachment flange portion with a plurality of circumferential spaced apart bolt threading portions, and a rotor centering portion located on a side of the rotor attachment flange portion that is opposite to the first flange, the rotor centering portion having a smaller outside diameter than the maximum outside diameter the tubular portion.

13. The bicycle disc brake hub according to claim 3, wherein the rotor attachment portion includes a plurality of protuberances circumferential spaced apart to define splines with a bottom diameter that is less than the maximum outside diameter of the tubular portion.

14. The bicycle disc brake hub according to claim 3, wherein the rotor attachment portion comprises a rotor attachment flange portion with a plurality of circumferential spaced apart bolt threading portions, and a rotor centering portion located on a side of the rotor attachment flange portion that is opposite to the first flange, the rotor centering portion having a smaller outside diameter than the maximum outside diameter the tubular portion.

15. The bicycle disc brake hub according to claim 4, wherein the rotor attachment portion includes a plurality of protuberances circumferential spaced apart to define splines with a bottom diameter that is less than the maximum outside diameter of the tubular portion.

16. The bicycle disc brake hub according to claim 4, wherein the rotor attachment portion comprises a rotor attachment flange portion with a plurality of circumferential spaced apart bolt threading portions, and a rotor centering portion located on a side of the rotor attachment flange portion that is opposite to the first flange, the rotor centering portion having a smaller outside diameter than the maximum outside diameter the tubular portion.

17. The bicycle disc brake hub according to claim 5, wherein the rotor attachment portion includes a plurality of protuberances circumferential spaced apart to define splines with a bottom diameter that is less than the maximum outside diameter of the tubular portion.

18. The bicycle disc brake hub according to claim 5, wherein the rotor attachment portion comprises a rotor attachment flange portion with a plurality of circumferential spaced apart bolt threading portions, and a rotor centering portion located on a side of the rotor attachment flange portion that is opposite to the first flange, the rotor centering portion having a smaller outside diameter than the maximum outside diameter the tubular portion.

* * * * *